April 29, 1952     J. R. JOBE     2,594,654
PIPE CUTTER
Filed Feb. 26, 1948
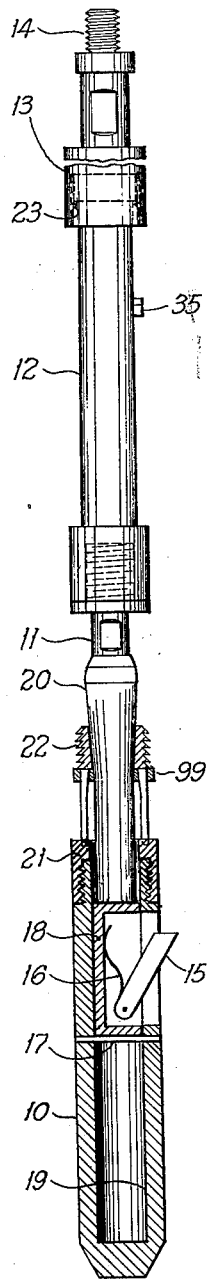
Fig. 1
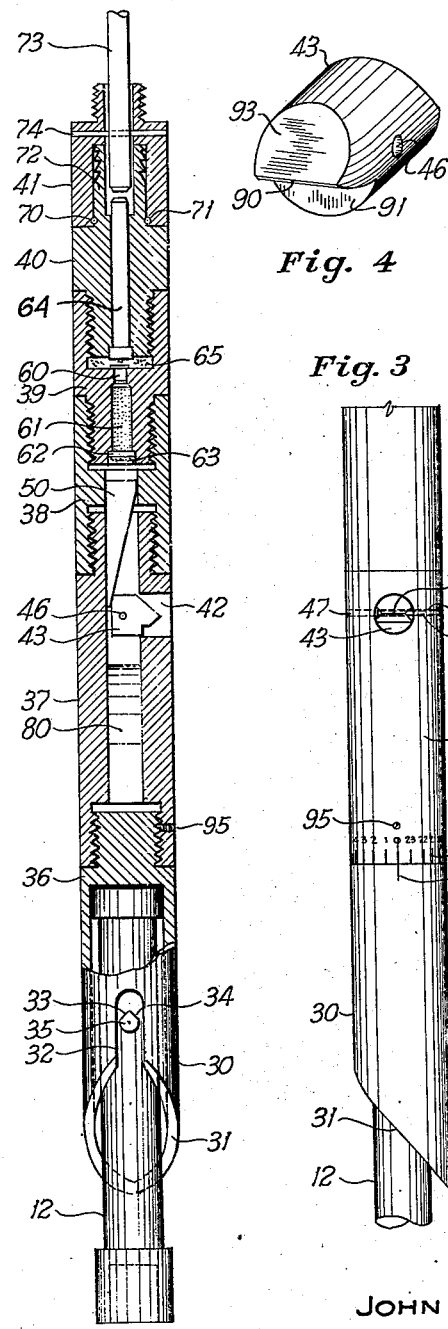
Fig. 2
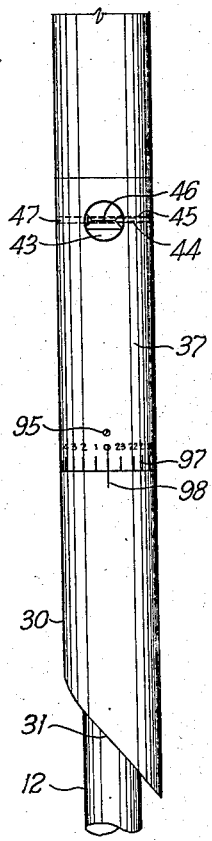
Fig. 4
Fig. 3
INVENTOR:
JOHN R. JOBE
BY Murray Robinson
ATTORNEY Patented Apr. 29, 1952

2,594,654

UNITED STATES PATENT OFFICE 2,594,654

PIPE CUTTER

John R. Jobe, Houston, Tex.

Application February 26, 1948, Serial No. 11,281

12 Claims. (Cl. 164—0.4)

This invention pertains to pipe cutters and more particularly to a device for severing the tubing of an oil well at a point below the surface of the earth although it may also be used for cutting any type of pipe such as well casing or drill pipe.

There are already known a number of jar actuated tools for cutting well tubing but these prior devices have the disadvantage that their use requires too much time, usually about eight hours, to cut a single tubing. Since the well is not producing during this period, there is a considerable monetary loss involved. Oftentimes where the well fluid is very heavy, it is found to be impossible to sever the tubing with such tools regardless of the time spent.

A principal object of this invention is to provide a tool that will enable a well tubing or the like to be severed in a comparatively short time.

An equally important object is to provide a tool which will function regardless of the weight of well fluid.

Additional objects of the invention are to provide a tool that is safe, reliable and economical in operation and simple and inexpensive to construct.

Other objects of the invention will become apparent as the description thereof proceeds.

Briefly described, the invention includes a cutting portion and an orienting portion. The cutting portion comprises a hollow tool body having an aperture in the side thereof within which slides the base of a cutting member having a knife edge on its outer extremity. Within the tool body near the upper end thereof there is a chamber for an explosive charge. Preferably there is provided a wedge adapted to slide in the tool body and which initially rests with its flat point on the top rear of the base of the cutting member. Explosion of the powder charge will drive the wedge down forcing the cutting member out so that its knife edge will cut through the tubing. The wedge also prevents the cutting member from turning so its knife edge remains perpendicular to the pipe axis. After the wedge is driven past the cutting member it falls into a pool of liquid in the bottom of the tool body which prevents the wedge from being damaged. A hole in the side of the tool body is uncovered when the wedge passes the cutting member thereby venting the exploding gas and preventing damage to the tool which might otherwise occur through excessive pressure buildup. The pressure relief allows the return of the cutting member which bounces back off the tubing into the body of the tool. Alternatively the wedge may be dispensed with and the exploding gas allowed to act directly against the cutting member, in which case the relief vent is provided in the side of the aperture within which the cutting member slides.

During the firing of the tool it rests on a support previously lowered into the well. The cutting portion of the tool is positioned with respect to the support by means of the orienting portion of the tool. The orienting portion comprises a bar attached to the upper end of the support having a radially disposed pin near its top adapted to cooperate with a slot in the end of a hollow pipe attached to the bottom of the cutting portion of the tool. After a cut has been made, the cutting portion of the tool is brought to the surface and the pipe on the end thereof, which is adjustable, turned a fraction of a revolution and the tool relowered for a new cut. This reorients the tool so that each cut is made immediately adjacent to the previous one or in any other predetermined position.

Since the power for actuating the cutting member is obtained from the explosive charge, there is no problem of getting sufficient force to drive the cutting member through the tubing wall as is the case with previously known jar actuated tools. The explosive may be fired mechanically with the firing pin actuated by jars but in such case only a very small force is required which is easily obtainable with even the heaviest well fluid. If desired the explosive may be fired electrically in which case of course the weight of the well fluid will have no effect whatsoever.

Because the tool can be accurately oriented, the tubing can be completely severed with only a few cuts as compared with the many cuts required where a hit or miss method is used. The tool also compares favorably with tools that use a plurality of blades to effect a nearly complete severing of the tubing in one trip into the well because its simplicity makes it more reliable and less expensive to manufacture. However, if desired, it would be possible to provide more than one cutting member in the tool according to the invention in which case if a wedge drive were used the wedge might have a plurality of angularly disposed tapered faces or might be in the form of a tapered mandrel.

For a detailed description of a preferred embodiment of the invention reference will now be made to the accompanying drawing wherein:

Figure 1 is a front elevation, partly in section, of the lower part of the orienting portion of the tool together with means for holding it in position;

Figure 2 is a side elevation, partly in section, showing both the tubing cutting and the orienting portions of the tool;

Figure 3 is a front elevation of the same portions of the tool shown in Figure 2; and Figure 4 is a perspective view of the cutting member.

Referring to Figure 1, there is shown an assembly comprising a collar finder 10, a slip support 11 and the lower part 12 of the orienting portion of the tool. This assembly is first lowered into the well on a wire line to the lower end of which is connected a releasable running tool 13. A set of jars is interposed between the running tool 13 and the wire line, the jars being connected onto the pin 14. When the assembly has been lowered into the well to the approximate point where it is desired to cut the tubing, the assembly is pulled upwardly until finger 15 catches in a collar, the finger being urged outwardly by spring 16. The line is then marked so as to fix the location of the collar. In this way it is assured that no attempt will be made to cut the tubing through a collar which would be much more difficult. A further upward pull is then exerted sufficient to break shear pin 17 which allows block 18 on which the finger 15 is supported to drop into the bottom portion 19 of the collar finder. The assembly can then be moved up and down without interference from finger 15. When the assembly has been placed with part 12 at the desired location in the tubing, the wire line is manipulated to cause mandrel 20 of the slip support to move downwardly with respect to the collar 21 which forces the pivotally mounted slips 22 out into engagement with the tubing. This causes the slips to engage the tubing with sufficient force to support the assembly in the tubing. The jars are then actuated to positively drive the mandrel down through the collar and thus firmly lock the slips in position. Further actuation of the jars releases the dogs 23 of the running tool 13 so that it may be removed from the well. This leaves the rod 12 fixed in the tubing locked against both downward movement and rotation.

After the rod 12 has been run into the well, the remainder of the tool shown in Figure 2 is lowered into the well on a set of jars at the end of a wire line. The tube 30 forming the upper half of the orienting portion of the tool is at the bottom end of the second assembly which is run into the well. The lower end of tube 30 is cut off at an angle as shown at 31 and at the upper end of the cut-off there is provided a slot 32. When the second assembly is lowered into the well, the tube 30 drops over the rod 12 and the face 31, at the lower end of tube 30, abuts against one or the other of the sloping top surfaces 33, 34 on pin 35 which extends radially from rod 12. This causes the tube 30 and the remainder of the tool connected above to turn inside the well tubing until pin 35 passes into slot 32. Further rotation of the tool is then prevented. This locks the tool against further rotation. The tube 30 continues its downward movement over rod 12 until the closed end 36 of the tube rests on the top of rod 12.

To the top of tube 30 there is connected the cutting portion of the tool. The cutting portion comprises a series of pipes 37, 38, 39, 40 and 41 suitably connected together. In the lowermost pipe 37 there is a radial bore 42 between the interior and exterior of the pipe forming a tubular support for the cutting member 43. As best shown in Figure 3, the cutting member 43 is normally held in position at the end of bore 42 by means of a shear pin 44 which passes through a hole 45 in the pipe 37 into an aperture 46 in the cutting member 43. Though the shear pin 44 does not extend all the way through the cutting member 43, the hole 45 in the pipe 37 is bored clear through the pipe to provide a vent opening 47.

Within the pipe 38 which is connected to the top of pipe 37, there is slideably disposed a wedge member 50. The upper end of the wedge member is cylindrical and the lower end of the wedge member is a truncated cylinder. The lower portion of the wedge member extends down into pipe 37 and normally rests with the tip of the flat face of the truncated portion against a flat beveled area at the top rear of the cutting member 43.

The pipe 39 is connected to the top of pipe 38. The pipe 39 is adapted to receive a percussion fired cap 60, a powder charge 61, seal disk 62 and lead tamping 63.

To the top of pipe 39 there is connected pipe 40 within which there is slideably disposed a firing pin 64. A soft metal washer 65 normally maintains the firing pin 64 out of contact with the sensitive end of cap 60. Pipe 41 is connected to pipe 40 by means of shear pins 70 and 71 driven through holes in pipe 41 which pass underneath an annular shoulder on the fishing neck 72 of pipe 40. Pipe 41 is connected to a jar mechanism which actuates bar 73. Bar 73 is normally held against movement by means of a shear pin 74 which passes through holes in pipe 41 and bar 73. However, when the jars are actuated shear pin 74 is broken so that bar 73 is driven down against firing pin 64 which in turn pierces disc 65 and fires cap 60. The cap ignites the powder charge 61 and the resulting explosion drives wedge 50 downwardly. This drives the cutting member 43 outwardly, cutting off shear pin 44. As long as the inclined face of the truncated end of the wedge is engaged with the flat bevelled face at the top rear of the cutting member the latter cannot rotate within the bore 42 so that cutting edge 90 which is parallel to said bevelled face remains perpendicular to the axis of rod 12 and pipes 30, 37—41 comprising the elongated body of the tool, as well as perpendicular to the axis of the cutting member. After the wedge 50 has passed the cutting member 43, it falls into a pool 80 of a liquid such as oil or mud in the bottom of pipe 37. At the same time vent 47 is uncovered so that the pressure of the exploding gas is relieved.

Referring to Figure 4, outward movement of the cutting member 43 brings the cutting edge 90 against the tubing and severs a portion of the tubing. After the cutting edge has penetrated the tubing further movement of the cutting member is prevented by stop shoulder 91 engaging the tube. This causes the cutting member to bounce back from the tubing into the bore 42. The sides of the cutting member near the cutting edge are bevelled to prevent the cutting edge from sticking in the tubing. The tool, except for the rod 12, is then withdrawn so that it may be prepared for the next operation. The upper face 93 of the cutting member 43 is beveled so that in case the cutting member does not rebound all the way back into the tool it will not prevent the tool from being withdrawn. When the tool is raised, if the cutting member projects slightly and hits against the end of a section of tubing, the bevel 92 will cause the cutting member to be forced back into the tool. Should the tool get hung up in the well for any reason, the shear pins 70 and 71 will release the pipe 41 from the remainder of the tool before sufficient pull can be exerted to break the wire line. The fishing neck 72 on the top of pipe 40 provides a means for grabbing hold of the tool with a stronger line when it becomes necessary to pull it out against the resistance of some obstruction.

After the tool has been withdrawn following the first operation thereof, the set screw 95 holding the tube 30 against rotation is released so that the tube 30 may be turned with respect to pipe 37. As shown in Figure 3, the bottom end of pipe 37 may be provided with graduations 97 and the tube 30 may be provided with an index line 98 so that the exact position of the tube 30 relative to pipe 37 can be determined. After the set screw 95 has been loosened, the tube 30 in turned a predetermined amount which usually will be made to correspond approximately with the length of the cut in the tubing made by one operation of the cutting member. The set screw is then tightened and the tool again lowered into the well on top of rod 12. The next operation of the tool will produce another cut in the tubing in the desired position relative to the previous cut as determined by the setting of tube 30 relative to pipe 37. After sufficient cuts have been made the tubing will be completely severed or, if desired, so nearly severed that it may be pulled.

After the tubing has been substantially severed but before it is pulled, the lower part of the orienting portion of the tool, together with the slip support 11 and collar finder 10 may be easily removed by lowering a pulling tool over the top end of bar 12. The slip support is easily disengaged by an upward pull which withdraws the mandrel 20 from the collar 21. This allows the slips to move inwardly. In case the slips should be stuck in the tubing they will be positively drawn inwardly by means of the guide 99 secured near the lower end of mandrel 20. After the slips have been freed from the tube they will rest on top of the guide 99 so that when the mandrel 20 is raised the collar finder 10 will also be withdrawn from the well.

While a preferred embodiment of the invention has been shown and described, it is obvious that many modifications could be made without departing from the spirit of the invention. It is intended to protect by Letters Patent all forms of the invention falling within the scope of the apparent claims.

I claim:

1. A tool for cutting pipe comprising a body having therein a chamber to receive an explosive, a tubular opening in said body extending through a side surface of said body, a cutting member reciprocatingly received in said opening, means to fire an explosive when placed in said chamber, and means to communicate the force of the resulting explosion to the rear of said cutting member, the front end of said cutting member tapering to a substantially straight sharp edge and having a shoulder back of said tapered portion lying in a plane perpendicular to the direction of travel of said member to engage said pipe to prevent the cutting member from passing through a cut made thereby and to cause the whole cutting member to rebound back into said opening, but said portion of said member having the shoulder being free to move through said opening in said body.

2. A tool for cutting pipe comprising an elongated body having therein a chamber to receive an explosive, a cylindrical opening extending through a side of said body disposed with its axis perpendicular to the length of said body, a cutting member having a cylindrical cross section substantially equal to that of said opening, said member being reciprocatingly received in said opening, means to fire an explosive when placed in said chamber, means to communicate the force of the resulting explosion to the rear of said cutting member, said cutting member having a substantially straight sharp edge lying substantially in a plane perpendicular to the direction of movement of the cutting member and in a plane perpendicular to the length of said body, and means to prevent rotation of the cutting member in said opening about the cylindrical axis thereof.

3. A tool for cutting pipe comprising a cylindrical body having therein a chamber to receive an explosive, a cylindrical opening in said body extending through a side surface thereof and disposed with its axis perpendicular to the axis of said body, a cutting member of cylindrical cross section substantially equal to that of said opening, said member being reciprocatingly received in said opening, said cutting member having a substantially straight sharp front edge disposed in a plane perpendicular to the axis of said body and in a plane perpendicular to the axis of said opening and having a flat surface on the rear thereof inclined to the axis thereof and parallel to said edge, means to fire an explosive when placed in said chamber, wedge means cooperating with said cutting member and said chamber to communicate the force of the resulting explosion to the rear of said cutting member to force the same out of said support, said wedge means comprising a wedge member having a tapered portion with a flat surface that acts against said flat surface on the rear of said cutting member.

4. A tool for cutting pipe comprising a body having therein a chamber to receive an explosive, a tubular opening in said body extending through a side surface thereof, a cutting member reciprocatingly received in said opening, a passage in said body connecting said chamber and said opening, means to fire an explosive when placed in said chamber, wedge means in said passage cooperating with said cutting member to communicate the force of the resulting explosion to the rear of said cutting member to force same out of said body, a hole in said body from said passage to the exterior of said body said hole being a separate hole distinct from said tubular opening, said hole being normally closed from communication with said chamber by said wedge member prior to the explosion, said hole being so positioned that it is opened to communication with said chamber after said wedge member has acted on the cutting member, and releasable means for normally holding said cutting member against said wedge member to retain said wedge member in hole closing position.

5. A tool for cutting pipe comprising a body having therein a chamber to receive an explosive, a tubular opening in said body extending through a side surface thereof, a cutting member reciprocatingly received in said opening, a passage in said body connecting said chamber and said opening, means to fire an explosive when placed in said chamber, means to communicate the force of the resulting explosion to the rear of said cutting member, a first support member, means on said first support member to anchor it against rotation and downward movement within said pipe, said anchor means including slips to engage the pipe and a wedge to force the slips into engagement with the pipe, a second support member connected to the lower end of said body, said first and second support members being provided with interengageable means which when engaged lock said first and second support members against relative rotation and hold the last said members in a singular predetermined position with respect to relative rotation, and means to adjust the azimuthal position of said opening relative to said anchoring means occupied when said interengageable means are engaged, the last said means being readily adjustable over the full perigon perpendicular to the axis of said pipe.

6. A tool for cutting pipe comprising a body having therein a chamber to receive an explosive, a tubular opening in said body extending through a side surface thereof, a cutting member reciprocatingly received in said opening, a passage in said body connecting said chamber and said opening, means to fire an explosive when placed in said chamber, means to communicate the force of the resulting explosion to the rear of said cutting member, a first support member adapted to be fixedly supported against rotation and downward movement within said pipe at any point along the axis thereof, a second support member connected to said body, said first and second members being provided with interengageable means which when engaged lock said first and second support members against relative rotation and hold the last said members in a singular predetermined position with respect to relative rotation, said first support member being closely adjacent the level of said opening when engaged with said second support member, said second support member including two parts, means to connect said parts for rotation one relative to the other about their longitudinal axes at least a full revolution and to prevent axial separation thereof and maintain axial alignment thereof in any position of rotation thereof one relative to the other, and means to hold said parts in any desired position with respect to rotation one relative to the other about their longitudinal axes.

7. A tool for cutting pipe comprising a body having therein a chamber to receive an explosive, a tubular opening in said body extending through a side surface thereof, a cutting member reciprocatingly received in said opening, a passage in said body connecting said chamber and said opening, means to fire an explosive when placed in said chamber, means to communicate the force of the resulting explosion to the rear of said cutting member, a first support member, means on said first support member to releasably anchor it against rotation and downward movement at any desired point within said pipe, a second support member connected to the lower end of said body, means to guide said first and second support members into a singular predetermined azimuthal position upon axial engagement thereof and to support the second member on the first member against rotation and downward movement relative thereto, and means to adjust the relative azimuthal positions of said second support member and said body with respect to each other over a full three hundred sixty degrees and to lock said second support member and said body in the desired adjusted position.

8. A cutting member for a pipe cutting tool comprising a cylindrical body, one end of said body being formed at least in part by a plane surface that is not perpendicular to the axis of the body, said surface being adapted to engage the flat surface of a wedge for driving the member along a barrel, the other end of said body being provided with a cutting edge perpendicular to the axis of the body and parallel to said plane surface, said other end also being provided with a stop surface disposed nearer the middle of the body than said edge, said stop surface lying in a plane substantially perpendicular to the axis of said body, all of the end surfaces of said body lying within the cylindrical surface defining the sides of said body.

9. A tool for cutting pipe comprising an elongated body having therein a chamber to receive an explosive, an opening extending through a side of said body disposed with its longitudinal axis perpendicular to the length of said body, a cutting member reciprocatingly received in said opening, said cutting member having a substantially straight sharp edge lying substantially at the intersection of a plane perpendicular to the direction of reciprocation of the cutter member and a plane perpendicular to the length of said body, said cutting member having a flat surface on the rear thereof inclined to the direction of reciprocation thereof and parallel to said edge, means to fire an explosive when placed in said chamber, means to communicate the force of the resulting explosion to the rear of said cutting member, said communicating means including a longitudinal passage inside said body connected to said chamber and to said opening and a wedge member reciprocatingly mounted in said passage, said wedge member having a tapered portion with a flat surface that acts against said flat surface on the rear of said cutting member, said adjoining flat faces constraining the motion of said cutter member to prevent rotation thereof during its outward movement following an explosion in said chamber.

10. A tool for cutting pipe comprising an elongated body having therein a chamber to receive an explosive, an opening extending through a side of said body disposed with its longitudinal axis perpendicular to the length of said body, a cutting member reciprocatingly received in said opening, said cutting member having a substantially straight sharp edge lying substantially at the intersection of a plane perpendicular to the direction of reciprocation of the cutter member and a plane perpendicular to the length of said body, said cutting member having a flat surface on the rear thereof inclined to the direction of reciprocation thereof and parallel to said edge, means to fire an explosive when placed in said chamber, means to communicate the force of the resulting explosion to the rear of said cutting member, said communicating means including a longitudinal passage inside said body connected to said chamber and to said opening and a wedge member reciprocatingly mounted in said passage, said wedge member having a tapered portion with a flat surface that acts against said flat surface on the rear of said cutting member, said adjoining flat faces constraining the motion of said cutter member to prevent rotation thereof during its outward movement following an explosion in said chamber, said cutter member having a stop thereon to engage the pipe to cause the cutting member to rebound after cutting the pipe instead of passing clear through, said cutting member being rotatable in said opening when not in contact with said wedge member and said passage extending beyond said opening whereby said wedge member moves out of contact with said cutting member after forcing the cutting member outward, leaving the cutting member free to rotate on its rebound from the pipe.

11. A tool for cutting pipe comprising an elongated body having therein a chamber to receive an explosive, a tubular opening in said body disposed with its axis perpendicular to the length of said body and extending through a side surface of said surface of said body, a cutting member reciprocatingly received in said opening, means to fire an explosive when placed in said chamber, means to communicate the force of the resulting explosion to the rear of said cutting member, said cutting member having a substantially straight sharp edge lying substantially at the intersection of a plane perpendicular to the direction of movement of the cutting member and a plane perpendicular to the length of said body, means to prevent rotation of said cutting member in said opening during outward movement thereof upon an explosion in said chamber, and adjustable means connected to said body disposed there below to guide said body in the pipe into a position in which said opening lies in a desired azimuthal direction relative to the pipe axis predetermined before the tool is placed in the pipe.

12. A tool for cutting pipe comprising a body having therein a chamber to receive an explosive, a tubular opening in said body extending through a side surface thereof, a cutting member reciprocatingly received in said opening, said cutting member having a substantially straight sharp front edge, a passage in said body connecting said chamber and said opening, means to fire an explosive when placed in said chamber, means to communicate the force of the resulting explosion to the rear of said cutting member, the last said means comprising a cylindrical part integral with the rear end of said cutting member and reciprocatingly fitting inside said tubular opening, said cylindrical part holding said front edge of the cutting member in a plane perpendicular to the axis of said opening, releasable means to hold said edge also in a plane perpendicular to the axis of said body, a first support member, means to fixedly support said member against rotation and downward movement within said pipe at any desired axial position in said pipe, the last said means including slips to engage the pipe and a wedge to force the slips into engagement with the pipe, a second support member connected to said body, said first and second members being provided with interengageable means which when engaged lock said first and second support members against relative rotation and hold the last said members in a singular predetermined position with respect to relative rotation.

JOHN R. JOBE.

REFERENCES CITED

The following references are of record in the file of this patent:

UNITED STATES PATENTS

| Number | Name | Date |
|---|---|---|
| 111,220 | Luther | Jan. 24, 1871 |
| 1,004,782 | Hardison | Oct. 3, 1911 |
| 1,851,319 | McCoy | Mar. 29, 1932 |
| 2,227,347 | Johnson | Dec. 31, 1940 |
| 2,243,099 | Johnson | May 27, 1941 |
| 2,262,041 | Pennella | Nov. 11, 1941 |
| 2,408,419 | Foster | Oct. 1, 1946 |
| 2,426,106 | Kinley | Aug. 19, 1947 |